(12) United States Patent
Madge

(10) Patent No.: US 10,358,941 B2
(45) Date of Patent: Jul. 23, 2019

(54) GAS TURBINE ENGINE

(71) Applicant: ROLLS-ROYCE plc, London (GB)

(72) Inventor: Jason J Madge, Dursley (GB)

(73) Assignee: ROLLS-ROYCE plc, London (GB)

( * ) Notice: Subject to any disclaimer, the term of this patent is extended or adjusted under 35 U.S.C. 154(b) by 197 days.

(21) Appl. No.: 15/625,675

(22) Filed: Jun. 16, 2017

(65) Prior Publication Data

US 2018/0003079 A1 Jan. 4, 2018

(30) Foreign Application Priority Data

Jul. 4, 2016 (GB) .................................. 1611605.5

(51) Int. Cl.
*F01D 25/16* (2006.01)
*F01D 5/06* (2006.01)
(Continued)

(52) U.S. Cl.
CPC ............. *F01D 25/162* (2013.01); *F01D 5/06* (2013.01); *F01D 15/08* (2013.01); *F01D 15/12* (2013.01); *F01D 25/16* (2013.01); *F01D 25/18* (2013.01); *F01D 25/186* (2013.01); *F02C 7/06* (2013.01); *F02C 7/36* (2013.01); *F16C 21/00* (2013.01); *F16C 33/1055* (2013.01);
(Continued)

(58) Field of Classification Search
CPC .......... F02D 15/12; F01D 25/16; F01D 25/18; F05D 2240/54; F05D 2260/40311; F05D 2260/98; F02C 7/06
USPC ........................................ 415/122.1; 475/342
See application file for complete search history.

(56) References Cited

U.S. PATENT DOCUMENTS

2012/0297770 A1* 11/2012 Figler ................... F01D 15/02
60/624
2013/0324343 A1* 12/2013 Gallet .................... F02C 3/107
475/159
(Continued)

FOREIGN PATENT DOCUMENTS

DE 102014201081 A1 7/2015
GB 2046365 A 11/1980
(Continued)

OTHER PUBLICATIONS

Dec. 1, 2017 Search Report issued in British Patent Application No. 1709620.7.

(Continued)

*Primary Examiner* — Lindsay M Low
(74) *Attorney, Agent, or Firm* — Oliff PLC

(57) ABSTRACT

A gas turbine engine comprises a gearbox comprising a sun gear, an annulus gear, a plurality of planet gears and a planet gear carrier. The sun gear meshes with the planet gears and the planet gears mesh with the annulus gear. Each planet gear is rotatably mounted in the planet gear carrier. The planet gear carrier comprises a plurality of axles arranged parallel to the axis of the gearbox. The axially spaced ends of each axle are secured to the planet gear carrier. Each planet gear is rotatably mounted on a corresponding one of the axles by a bearing arrangement. Each bearing arrangement comprises a journal bearing and a rolling element bearing and each planet gear is rotatably mounted on a journal bearing and each journal bearing is rotatably mounted on an axle by at least one rolling element bearing.

20 Claims, 4 Drawing Sheets

(51) Int. Cl.
    *F01D 15/08*    (2006.01)
    *F01D 15/12*    (2006.01)
    *F01D 25/18*    (2006.01)
    *F16C 21/00*    (2006.01)
    *F16C 33/10*    (2006.01)
    *F16C 33/66*    (2006.01)
    *F16H 1/28*     (2006.01)
    *F16H 57/04*    (2010.01)
    *F16H 57/08*    (2006.01)
    *F02C 7/06*     (2006.01)
    *F02C 7/36*     (2006.01)

(52) U.S. Cl.
    CPC ........... *F16C 33/6677* (2013.01); *F16H 1/28* (2013.01); *F16H 57/043* (2013.01); *F16H 57/0479* (2013.01); *F16H 57/082* (2013.01); *F05D 2220/32* (2013.01); *F05D 2240/50* (2013.01); *F05D 2260/40311* (2013.01); *F16C 2360/23* (2013.01); *F16C 2361/61* (2013.01); *F16H 2057/085* (2013.01)

(56) References Cited

U.S. PATENT DOCUMENTS

| | | | |
|---|---|---|---|
| 2017/0108110 A1* | 4/2017 | Sheridan | F02C 3/04 |
| 2017/0108113 A1* | 4/2017 | Hasting | F16H 57/0471 |
| 2017/0114831 A1* | 4/2017 | Snow | F01D 25/162 |
| 2017/0219080 A1* | 8/2017 | Niergarth | F02C 7/36 |
| 2017/0248033 A1* | 8/2017 | Moniz | F02C 3/067 |

FOREIGN PATENT DOCUMENTS

| | | |
|---|---|---|
| GB | 1587285 A | 4/1981 |
| JP | H01-127939 U | 8/1989 |

OTHER PUBLICATIONS

Jan. 17, 2017 Search Report issued in British Patent Application No. 1611605.5.

\* cited by examiner

GAS TURBINE ENGINE

The present disclosure concerns a gas turbine engine an in particular to a geared gas turbine engine and more particularly to a geared turbofan gas turbine engine or a geared turbo propeller gas turbine engine.

Geared gas turbine engines have a gearbox to drive the fan or propeller. The gearbox may be a planetary gearbox which allows the speed of rotation of the fan or propeller to be reduced compared to the speed of rotation of a driving turbine. This improves the efficiency of the fan, or the propeller, and the turbine. A planetary gearbox comprises a sun gear, an annulus gear and a plurality of planet gears rotatably mounted in a planet carrier. The sun gear is arranged to be driven by the turbine, the annulus gear is fixed to static structure, the planet gears orbit around the sun gear and the planet carrier drives the fan or propeller. The gearbox may be a star gearbox which comprises a sun gear, an annulus gear and a plurality of star gears rotatably mounted in a star carrier. The sun gear is arranged to be driven by the turbine, the star carrier is fixed to static structure, the star gears rotate around their own axes and the star carrier drives the fan or propeller.

In large, high rotational speed gearboxes the gearbox must endure very high loads due to both centrifugal loads from the planet gears and the basic torque load which it is required to transmit. As a result the bearings which mount the planet gears, or star gears, on the planet carrier, or star carrier, are highly loaded. The gearbox requires a lubricant supply to supply lubricant to the gears and the bearings of the planet gears. The lubricant lubricates and cools the gears and the bearings of the planet gears.

Typically the highest load capacity is available from a hydrodynamic, or a journal, bearing which relies on a hydrodynamic film of lubricant forming due to the shearing of the lubricant which is supplied to the bearing. The lubricant supplied to the bearing provides both separation of the rotating and static surfaces and removes heat generated within the bearing.

If the supply of lubricant is interrupted, the load carrying film of lubricant will eventually break down causing a dramatic increase in friction between the rotating and static surfaces and additionally the ability to remove heat from the bearing surfaces is lost. Under these conditions the generation of heat is so rapid that bearing damage may result in less than a second. It is therefore imperative that the supply of lubricant is not interrupted in a gearbox where the resulting damage to the gearbox may result in an unsafe situation, for example in the case of a gearbox of an aero gas turbine engine.

Journal bearings are often good contacting bearings and have linings composed of a material which is soft and has relatively low friction. Therefore, these materials are able to cope with short periods of time, for example during start-up or shut-down of the operation of the gearbox, in which the lubricant supply to the journal bearings has been interrupted. However, some wear occurs during these interruptions of the lubricant supply to the gearbox and over the working life of the gearbox this wear may be sufficient to either comprise the alignment and positioning of the gears or to wear the away the lining completely.

At the present time there are no journal bearing materials which are able to cope with an interruption of the lubricant supply for a realistic period of time at high power settings, because the frictional heating results in damage to the journal bearings of the gearbox.

To mitigate the risk of an interruption in the supply of lubricant to the journal bearings of the gearbox it is known to provide a back-up supply of lubricant which, in the event of an interruption to a main supply of lubricant, is able to supply lubricant to the journal bearings to prevent damage to the journal bearings. However, the provision of a back-up supply of lubricant may result in a significant increase in complexity, cost and weight of the gearbox which is undesirable especially in the case of an aero gas turbine engine. Furthermore, there is still a risk that the back-up supply of lubricant may fail.

Rolling element bearings, e.g. ball bearings or roller bearings, are less sensitive to an interruption in the supply of lubricant than journal bearings. In rolling element bearings the relative rotation between an inner race and an outer race is accommodated by a rolling action of the rolling elements rather than a sliding action. Rolling element bearings are known to generate significantly less heat than journal bearings during an interruption to the supply of lubricant and therefore are more tolerant to an interruption in the lubricant supply for short periods of time. However, the geometry of rolling element bearings results in very high contact stresses, which may under large numbers, millions, of rolling cycles result in spalling of the surfaces of the inner and outer races and the rolling elements. In general rolling element bearings are less reliable that journal bearings in highly loaded applications, for example gearboxes, e.g. planetary gearboxes or other epicyclic gearboxes.

Accordingly, the present invention seeks to provide a gas turbine engine comprising a gearbox in which the above mentioned problem is reduced or overcome.

According to a first aspect of the disclosure there is provided a gas turbine engine comprising a bearing arrangement for first and second relatively rotatable members, the bearing arrangement comprising a journal bearing and a rolling element bearing, the second member being arranged coaxially around the first member, the second member having a cylindrical inner surface, the rolling element bearing and the journal bearing being arranged radially between the first member and the second member, the rolling element bearing being positioned radially between the first member and the journal bearing and the journal bearing being positioned radially between the rolling element bearing and the second member, the journal bearing comprising a tubular member, the tubular member having a cylindrical outer surface arranged to cooperate with the cylindrical inner surface of the second member, the tubular member and the second member being relatively rotatable, the bearing arrangement comprising a lubricant supply to supply lubricant to the rolling element bearing and the journal bearing having at least one passage extending radially there-through to supply lubricant from the rolling element bearing to the journal bearing.

The journal bearing may form an outer race of the rolling element bearing or the journal bearing may carry an outer race of the rolling element bearing.

The axial ends of the rolling element bearing may have seals.

The first member may have at least one passage extending radially there-through to supply lubricant to the at least one rolling element bearing.

The first member may be a shaft and the second member being a static structure.

The first member may be a first shaft and the second member being a second shaft.

The rolling element bearing may be a roller bearing, a taper roller bearing or a ball bearing.

The shaft may have at least one passage extending radially there-through to supply lubricant to the at least one rolling element bearing.

The axial ends of the at least one rolling element bearing on the shaft may be sealed and the journal bearing has at least one passage extending radially there-through to supply lubricant from the at least one rolling element bearing to the journal bearing.

The gas turbine engine may comprise a gearbox, the gearbox comprising a sun gear, an annulus gear, a plurality of planet gears and a planet gear carrier, the sun gear meshing with the planet gears and the planet gears meshing with the annulus gear, each planet gear being rotatably mounted in the planet gear carrier, the planet carrier comprising a plurality of axles arranged parallel to the axis of the gearbox, the axially spaced ends of each axle being secured to the planet carrier, each planet gear being rotatably mounted on a corresponding one of the axles by a bearing arrangement, each bearing arrangement comprising a journal bearing and a rolling element bearing, each planet gear being rotatably mounted on a journal bearing and each journal bearing being rotatably mounted on an axle by at least one rolling element bearing.

The rolling element bearings may be roller bearings.

The rolling element bearings may be needle roller bearings.

Each journal bearing may be rotatably mounted on an axle by two rolling element bearings.

The planet gear carrier may comprise a first ring, a second ring spaced axially from the first ring and a plurality of circumferentially spaced axles extending axially between the first ring and the second ring, each planet gear being rotatably mounted on a respective one of the axles.

Each axle may have at least one passage extending radially there-through to supply lubricant to the at least one rolling element bearing.

The axial ends of the at least one rolling element bearing on each axle may be sealed and each journal bearing has at least one passage extending radially there-through to supply lubricant from the at least one rolling element bearing to the journal bearing.

The gas turbine engine may comprise a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

The gas turbine engine may comprising a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

The gas turbine engine may comprise a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

The gas turbine engine may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

Alternatively, the gas turbine engine comprises a first propulsor, a second propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to drive the intermediate-pressure compressor and the low-pressure turbine is arranged to drive the first propulsor and the second propulsor via a gearbox.

The sun gear may be driven by the low-pressure turbine, the annulus gear may be secured to static structure and the planet gear carrier may be arranged to drive the propulsor.

The sun gear may be driven by the low-pressure turbine, the planet gear carrier may be secured to static structure and the annulus gear may be arranged to drive the propulsor.

The planet gear carrier may be driven by the low-pressure turbine, the sun gear may be secured to static structure and the annulus gear may be arranged to drive a propulsor.

The sun gear may be driven by the low-pressure turbine, the planet gear carrier may be arranged to drive a first propulsor and the annulus gear may be arranged to drive a second propulsor.

The propulsor is a fan or a propeller.

According to a second aspect of the disclosure there is provided a gearbox comprising a sun gear, an annulus gear, a plurality of planet gears and a planet gear carrier, the sun gear meshing with the planet gears and the planet gears meshing with the annulus gear, each planet gear being rotatably mounted in the planet gear carrier, the planet carrier comprising a plurality of axles arranged parallel to the axis of the gearbox, the axially spaced ends of each axle being secured to the planet carrier, each planet gear being rotatably mounted on a corresponding one of the axles by a bearing arrangement, each bearing arrangement comprising a journal bearing and a rolling element bearing, each planet gear being rotatably mounted on a journal bearing and each journal bearing being rotatably mounted on an axle by at least one rolling element bearing, each planet gear having a cylindrical inner surface, each journal bearing comprising a tubular member, the tubular member of each journal bearing having a cylindrical outer surface arranged to cooperate with the cylindrical inner surface of the corresponding planet gear, each tubular member and the corresponding planet gear being relatively rotatable, the bearing arrangement comprising a lubricant supply to supply lubricant to each rolling element bearing and each journal bearing having at least one passage extending radially there-through to supply lubricant from the corresponding rolling element bearing to the journal bearing.

According to a third aspect of the disclosure there is provided a bearing arrangement for first and second relatively rotatable members, the bearing arrangement comprising a journal bearing and a rolling element bearing, the second member being arranged coaxially around the first member, the second member having a cylindrical inner surface, the rolling element bearing and the journal bearing being arranged radially between the first member and the second member, the rolling element bearing being positioned radially between the first member and the journal bearing and the journal bearing being positioned radially between the rolling element bearing and the second member, the journal bearing comprising a tubular member, the tubular member having a cylindrical outer surface arranged to cooperate with the cylindrical inner surface of the second member, the tubular member and the second member being relatively rotatable, the bearing arrangement comprising a lubricant supply to supply lubricant to the rolling element bearing and the journal bearing having at least one passage extending radially there-through to supply lubricant from the rolling element bearing to the journal bearing.

The skilled person will appreciate that except where mutually exclusive, a feature described in relation to any one of the above aspects of the invention may be applied mutatis mutandis to any other aspect of the invention.

Embodiments of the disclosure will now be described by way of example only, with reference to the Figures, in which.

Figure 1:
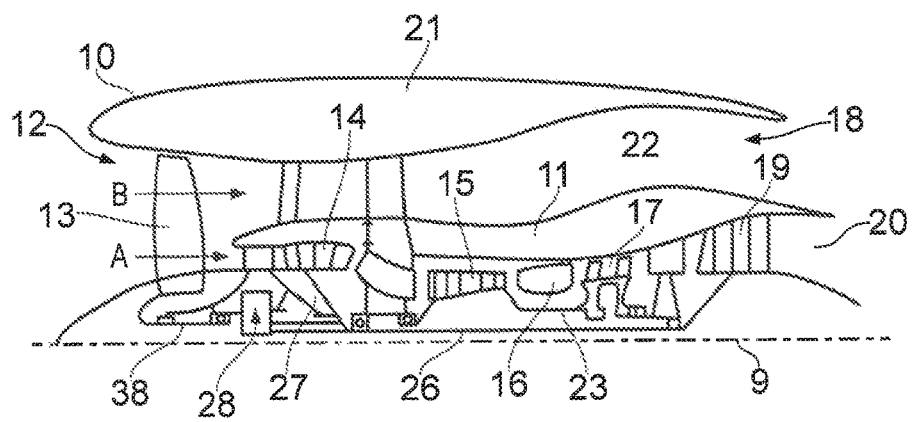
FIG. 1 is a part sectional side view of a geared turbofan gas turbine engine according to the present disclosure.
Figure 2:
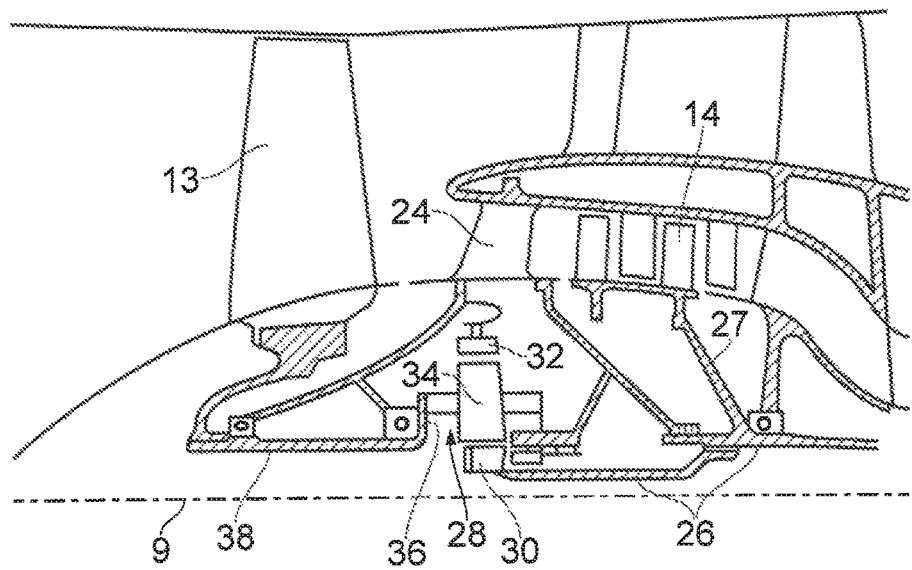
FIG. 2 is an enlarged part sectional side view of a portion of the geared turbofan gas turbine engine shown in FIG. 1.

With reference to FIGS. 1 and 2, a geared turbofan gas turbine engine is generally indicated at 10, having a principal and rotational axis 9. The engine 10 comprises, in axial flow series, an air intake 12, a propulsive fan 13, an intermediate-pressure, or booster, compressor 14, a high-pressure compressor 15, combustion equipment 16, a high-pressure turbine 17, a low-pressure turbine 19 and a core exhaust nozzle 20. The intermediate-pressure compressor 14, the high-pressure compressor 15, the combustion equipment 16, the high-pressure turbine 17 and the low-pressure turbine 19 form a core engine 11. A nacelle 21 generally surrounds the engine 10 and defines the intake 12, a bypass duct 22 and a bypass exhaust nozzle 18.

The gas turbine engine 10 works in the conventional manner so that air entering the intake 12 is accelerated by the fan 13 to produce two air flows: a first air flow A into the intermediate-pressure compressor 14 and a second air flow B which passes through the bypass duct 22 to provide the majority of the propulsive thrust. The intermediate-pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high and low-pressure turbines 17, 19 before being exhausted through the core nozzle 20 to provide additional propulsive thrust. The high-pressure turbine 17 drives the high-pressure compressor 15 by a shaft 23. The low-pressure turbine 19 drives the intermediate-pressure compressor 14 directly via shafts 26 and 27. The low-pressure turbine 19 drives the fan 13 indirectly via the shaft 26, a gearbox 28 and a shaft 38. The gearbox 28 comprises a sun gear 30, an annulus gear 32, a plurality of planet gears 34 and a planet gear carrier 36. The sun gear 30 meshes with the planet gears 34 and the planet gears 32 mesh with the annulus gear 32. The planet gear carrier 36 constrains the planet gears 34 to precess around the sun gear 30 in synchronicity whilst enabling each planet gear 34 to rotate about its own axis independently. The planet gear carrier 36 is coupled via the shaft 38 to the fan 13 in order to drive its rotation about the engine axis 9. The annulus gear 32 is coupled to a static structure 24. The axes of the planet gears 34 and the axis of the planet gear carrier 36 are parallel to the engine axis 9. The shaft 38 is rotatably mounted in static structure by one or more bearings, e.g. rolling element bearings, e.g. roller bearings or ball bearings.

Figure 3:
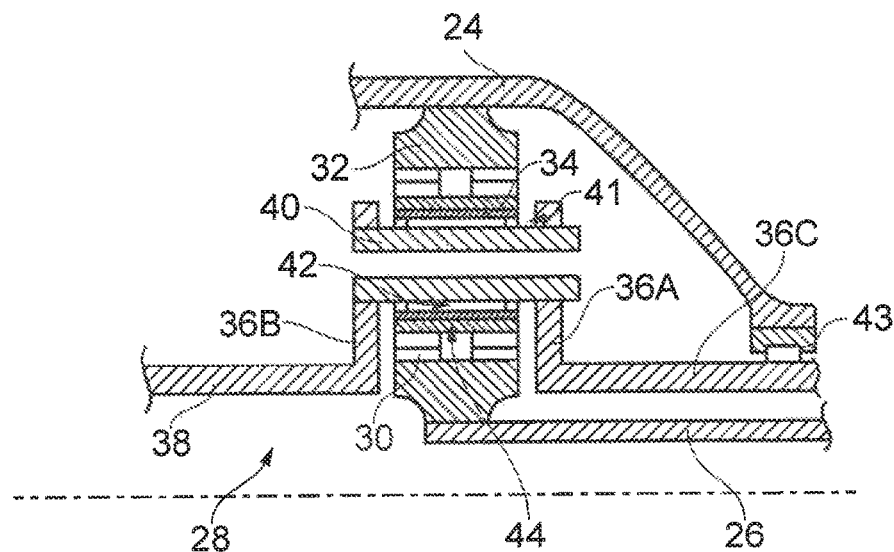
FIG. 3 is an enlarged cross-sectional view though the gearbox shown in FIG. 2.
Figure 4:
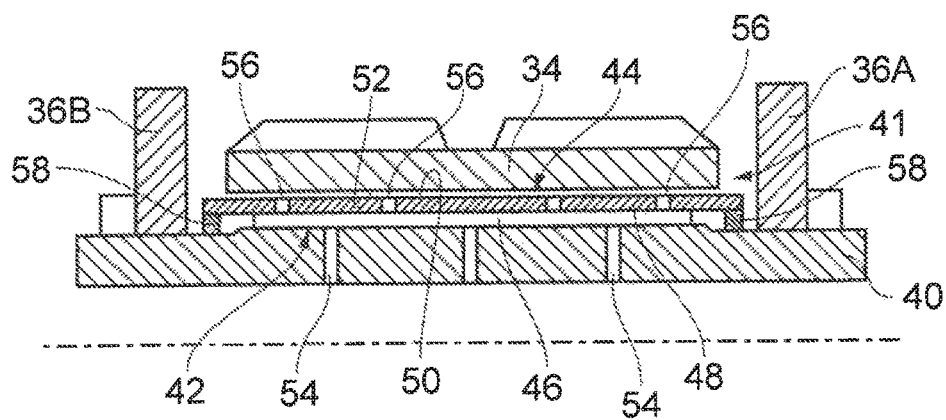
FIG. 4 is a further enlarged cross-sectional view of a portion of the planet gear carrier and a bearing arrangement shown in FIG. 3.

The gearbox 28 is shown more clearly in FIGS. 3 and 4 and the planet gear carrier 36 comprises a first ring 36A, a second ring 36B spaced axially from the first ring 36A, an extension shaft 36C and a plurality of circumferentially spaced axles 40 which extend axially between the first ring 36A and the second ring 36B. The extension shaft 36C of the planet gear carrier 36 is rotatably mounted in the static structure 24 by a bearing 43. The axles 40 are also arranged parallel to the engine axis 9 and thus the axis of the gearbox 28. The axially spaced ends of each axle 40 are secured to the planet gear carrier 36, e.g. to the first ring 36A and the second ring 36B. In this arrangement each planet gear 36 is arranged around a respective one of the axles 40 and at least one rolling element bearing 42 is positioned radially between a respective axle 40 and a respective journal bearing 44 and each journal bearing 44 is positioned radially between the respective rolling element bearing 42, or respective rolling element bearings 42, and the respective planet gear 34. Each planet gear 34 is rotatably mounted in the planet gear carrier 36 and in particular each planet gear 34 is rotatably mounted on a respective one of the axles 40 by a bearing arrangement 41. Each bearing arrangement 41 comprises a journal bearing 44 and at least one rolling element bearing 42 and each planet gear 34 is rotatably mounted on a journal bearing 44 and each journal bearing 44 is rotatably mounted on an axle 40 by the at least one rolling element bearing 42. A lubrication system is arranged to supply lubricant to the planet gear bearing arrangements 41, the sun gear 30 and the planet gears 34.

A planet gear 34, an axle 40 and an associated bearing arrangement 41 is shown more clearly in FIG. 4. In this arrangement a single rolling element bearing 42 is provided immediately around the axle 40 and the axle 40 forms an inner race of the rolling element bearing 42. A plurality of rolling elements 46 are arranged circumferentially around and are arranged to roll on the axle 40. The rolling elements 46 are mounted in a cage (not shown) which spaces the rolling elements 46 circumferentially. The rolling elements 46 and the cage are positioned radially between the axle 40 and the journal bearing 44 and the journal bearing 44 forms an outer race of the rolling element bearing 42. The journal bearing 44 comprises a radially outer surface 50 and a radially inner surface 52 of the planet gear 34 which is arranged to slide on the radially outer surface 50 of the journal bearing 44. A plurality of passages 54 extend radially through the axle 40 from the interior of the axle 40 to the rolling element bearing 42 to supply lubricant to the rolling element bearing 42. Also a plurality of passages 56 extend radially through the journal bearing 44 from the rolling element bearing 42 to the surfaces 50 and 52 of the journal bearing 44 to supply lubricant from the rolling element bearing 42 to the journal bearing 44. Seals 58 are arranged at the axial ends of the rolling element bearings 42 to prevent the escape of lubricant. The rolling element bearings 42 are roller bearings and preferably are needle roller bearings. The journal bearing 44 comprises a tubular member 48 which has a cylindrical outer surface 50 arranged to cooperate with a cylindrical inner surface 52 of the planet gear 34. The seals 58 at the axial ends of the rolling element bearings 42 may be arranged to allow controlled leakage of the lubricant to avoid coking in the rolling element bearings 42.

Alternatively, the rolling element bearing 42 may comprise a separate inner race which is located on the axle 40 and a separate outer race which is located on the journal bearing 44. In this case the passages 54 may also extend through the inner race and the passages 56 must extend through the outer race. If two axially spaced rolling element bearings are used with separate inner races located on the axle, the passages 54 need only extend through the axles 40 and the passages 56 must extend through the outer race.

In operation lubricant is supplied to the gearbox 28 and some of the lubricant is supplied into the interior of each axle 40. The lubricant flows through the passages 54 of each axle 40 to the rolling element bearing 42 of the bearing arrangement 41 of the respective planet gear 34 and then through the passages 56 from the rolling element bearing 42 to the journal bearing 44 of the respective planet gear 34. The lubricant flows axially along the journal bearing 44 of the respective planet gear 34 and is discharged from the axial ends of the journal bearing 44.

In normal operation the lubricant fills each of the rolling element bearings 42 and results in a high level of drag within the rolling element bearing 42. At the same time the journal bearings 44 are also supplied with lubricant and therefore operate as normal. The high level of drag within the rolling element bearings 42 means that the journal bearings 44 present a lower internal friction than the rolling element bearings 42 and therefore rotation of the planet gears 34 is allowed by the journal bearings 44 and not by the rolling element bearings 42. Hence, the rolling element bearings 42 will not experience very much rotation and therefore, while the contact stresses are high, the number of rotations will be relatively small resulting in high life expectancy. The rolling element bearings 42 are not actively restrained while the journal bearings 44 are functioning and therefore the rolling element bearings 42 will slowly rotate and hence reduce the possibility of fretting damage or false Brinelling damage.

In abnormal circumstances, when there is an interruption of the supply of lubricant, the lubricant flows from the rolling element bearings 42 to the journal bearings 44 and then lubricant flows out of the journal bearings 44. The draining of lubricant from the rolling element bearings 42 reduces the internal friction of the rolling element bearing 42 and then the journal bearings 44 become starved of lubricant and the internal friction levels in the journal bearings increase as the surfaces 50 and 52 come directly into contact. Eventually, the level of friction in the journal bearings 44 rises above the level of friction in the rolling element bearings 42 and therefore rotation of the planet gears 34 is allowed by the rolling element bearings 42 and not by the journal bearings 44. Hence, the journal bearings 44 will not experience significant relative rotation between the surfaces 50 and 52 and hence heat generation.

Thus, it is seen that the presence/absence of lubricant in the gearbox acts as a switch between using the journal bearing to provide rotational mounting of the planet gears on the axles and using the rolling element bearings to provide rotational mounting of the planet gears on the axles.

An advantage of the present disclosure is that it provides a gas turbine engine with a gearbox which is able to operate in the event of an interruption in the supply of lubricant to the bearings of the planet gears. An advantage of the present disclosure is that it provides a gas turbine engine with a gearbox which is able to operate in the event of an interruption in the supply of lubricant to the bearings of the planet gears without the provision of a back-up supply of lubricant. An advantage of the present disclosure is that it provides a gas turbine engine with a gearbox in which the planet gears automatically switch between using journal bearings during normal operation, normal supply of lubricant, and using rolling element bearings during abnormal operation, interruption of supply of lubricant, e.g. negative "G" operation, start-up etc. An advantage of the present disclosure is that it provides a gas turbine engine with a gearbox in which the journal bearings of the planet gears are able to operate with high reliability in the presence of potential lubrication interruption.

Figure 5:
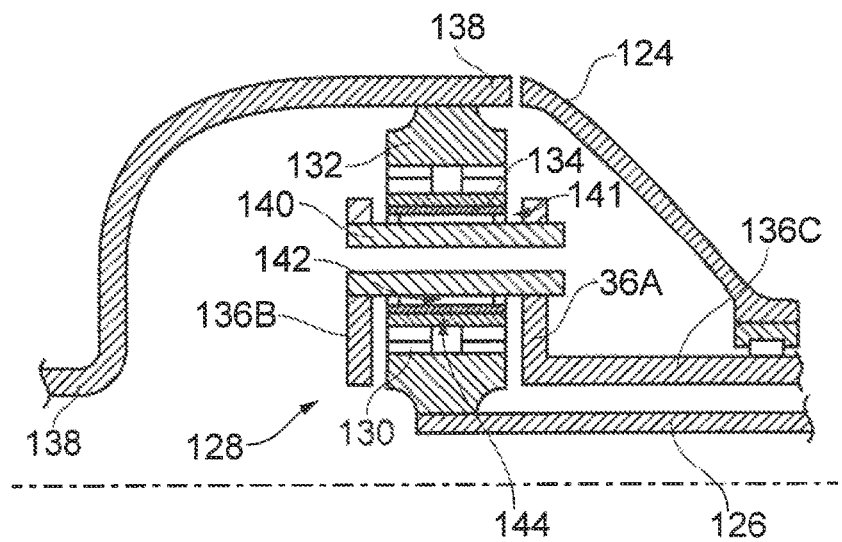
FIG. 5 is an enlarged alternative cross-sectional view though the gearbox shown in FIG. 2.

FIG. 5 shows an arrangement in which the low-pressure turbine 19 drives the fan 13 indirectly via the shaft 126, a gearbox 128 and a shaft 138. The gearbox 128 comprises a sun gear 130, an annulus gear 132, a plurality of star gears 134 and a star gear carrier 136. The sun gear 130 meshes with the star gears 134 and the star gears 134 mesh with the annulus gear 132. The star gear carrier 136 enabling each star gear 134 to rotate about its own axis independently. The star gear carrier 136 is coupled to a static structure 124. The annulus gear 132 is coupled via the shaft 138 to the fan 13 in order to drive its rotation about the engine axis 9. The axes of the star gears 134 are parallel to the engine axis 9. The star gear carrier 136 comprises a first ring 136A, a second ring 136B spaced axially from the first ring 136A and a plurality of circumferentially spaced axles 140 which extend axially between the first ring 136A and the second ring 136B. Each star gear 134 is rotatably mounted on a respective one of the axles 140 and an annular extension 136C extends axially from the first ring 136A. The annular extension 136C is secured to the static structure 124. Each star gear 134 is rotatably mounted in the star gear carrier 136 and in particular each star gear 134 is rotatably mounted on a respective one of the axles 140 by a bearing arrangement 141. Each bearing arrangement 141 comprises a journal bearing 144 and a rolling element bearing 142 and each star gear 134 is rotatably mounted on a journal bearing 144 and each journal bearing 144 is rotatably mounted on an axle 140 by at least one rolling element bearing 142. A lubrication system is arranged to supply lubricant to the star gear bearings 142, the sun gear 130 and the star gears 134. The bearing arrangement 141 is substantially the same, and operates in substantially the same way, as that shown in FIG. 4.

Figure 6:
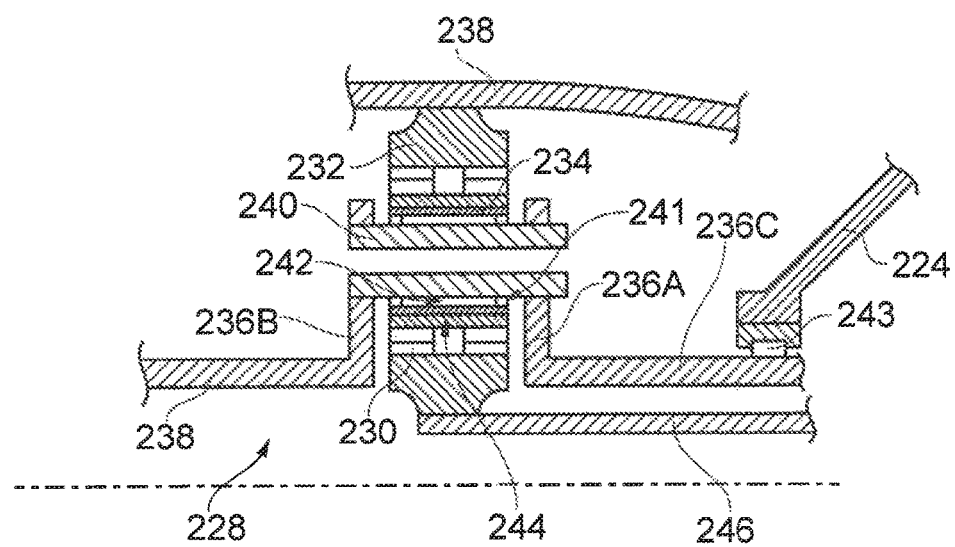
FIG. 6 is an enlarged further cross-sectional view though the gearbox shown in FIG. 2.

FIG. 6 shows an arrangement in which the low-pressure turbine 19 drives two fans indirectly via the shaft 226, a gearbox 228 and shaft 238A and 238B. The gearbox 228 comprises a sun gear 230, an annulus gear 232, a plurality of planet gears 234 and a planet gear carrier 236. The sun gear 230 meshes with the planet gears 234 and the planet gears 234 mesh with the annulus gear 232. The planet gear carrier 236 enabling each planet gear 234 to rotate about its own axis independently. The planet gear carrier 236 is coupled via the shaft 238A to a first propulsor (not shown) and the annulus gear 232 is coupled via the shaft 238B to a second propulsor (not shown) in order to drive their rotation about the engine axis 9. The propulsors are driven to rotate in opposite rotational directions. The axes of the planet gears 234 are parallel to the engine axis 9. The planet gear carrier 236 comprises a first ring 236A, a second ring 236B spaced axially from the first ring 236A and a plurality of circumferentially spaced axles 240 which extend axially between the first ring 236A and the second ring 236B. Each planet gear 234 is rotatably mounted on a respective one of the axles 240 and an annular extension 236C extends axially from the first ring 236A. The annular extension 236C is rotatably mounted in the static structure 224 by a bearing 243. Each planet gear 234 is rotatably mounted in the planet gear carrier 236 and in particular each planet gear 234 is rotatably mounted on a respective one of the axles 240 by a bearing arrangement 241.

Each bearing arrangement 241 comprises a journal bearing 244 and a rolling element bearing 242 and each planet gear 234 is rotatably mounted on a journal bearing 244 and each journal bearing 244 is rotatably mounted on an axle 240 by at least one rolling element bearing 242. A lubrication system is arranged to supply lubricant to the planet gear bearings 242, the sun gear 230 and the planet gears 234. The bearing arrangement 241 is substantially the same, and operates in substantially the same way, as that shown in FIG. 4.

In each of the arrangements described above the sun gear, the annulus gear, the planet gear carrier, or star gear carrier, and the shaft are coaxial.

In each of the arrangements described above the lubricant, e.g. oil, lubricates and cools the sun, annulus and planet gears and the bearings of the planet gears or cools the sun, annulus and star gears and the bearings of the star gears.

As described above, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

Alternatively, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

Alternatively, the gas turbine engine comprises a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

Alternatively the gas turbine engine may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

Alternatively, the gas turbine engine comprises a first propulsor, a second propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine, a low-pressure turbine and a free power turbine, the high-pressure turbine is arranged to directly drive the high-pressure compressor, the low-pressure turbine is arranged to directly drive the low-pressure compressor and the free power turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine and a low-pressure turbine, the high-pressure turbine is arranged to directly drive the high-pressure compressor, the low-pressure turbine is arranged to directly drive the low-pressure compressor and the low-pressure turbine is arranged to drive the first propulsor and the second propulsor via a gearbox.

The sun gear may be driven by a low-pressure turbine, the annulus gear may be secured to static structure and the planet gear carrier may be arranged to drive a propulsor.

The sun gear may be driven by the low-pressure turbine, the planet gear carrier may be secured to static structure and the annulus gear may be arranged to drive a propulsor. In this arrangement the planet gears are termed star gears and the annular extension of the planet gear carrier is secured to the static structure. In this arrangement each planet gear rotates about its own axis and the planet gear carrier does not rotate about the engine axis. The axes of the planet gears are parallel to the engine axis.

The planet gear carrier may be driven by the low-pressure turbine, the sun gear may be secured to static structure and the annulus gear may be arranged to drive a propulsor.

The sun gear may be driven by the low-pressure turbine, the planet gear carrier may be arranged to drive a first propulsor and the annulus gear may be arranged to drive a second propulsor.

The propulsor may be a fan or a propeller.

Figure 7:
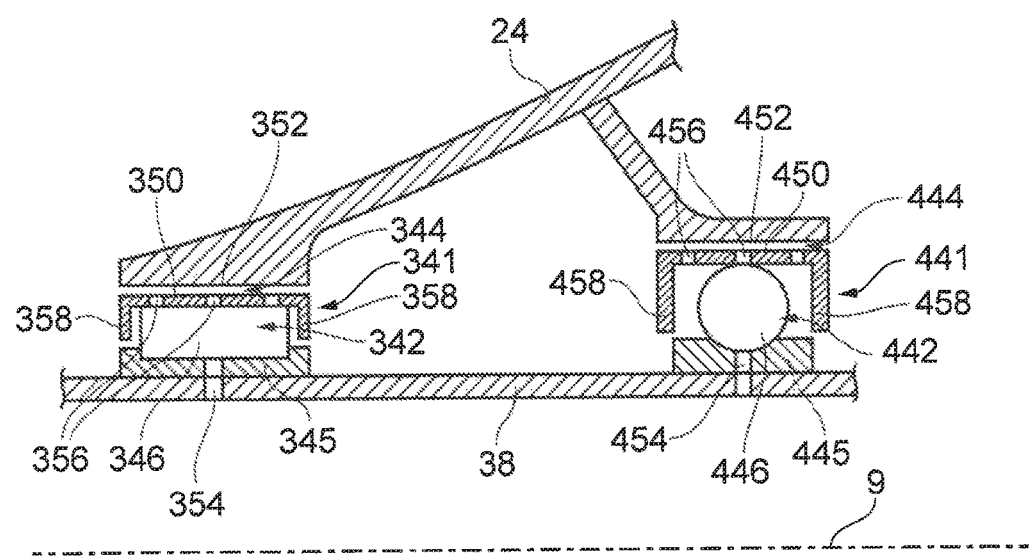
FIG. 7 is an enlarged cross-sectional view through two bearing arrangements shown in FIG. 2.

FIG. 7 shows that the shaft 38, which drives the fan 13, is rotatably mounted in static structure 24 by two axially spaced bearing arrangements 341 and 441. The bearing arrangement 341 comprises a journal bearing 344 and a rolling element bearing 342. The rolling element bearing 342 and the journal bearing 344 are positioned radially between the shaft 38 and the static structure 24. In this arrangement the static structure 24 is arranged around the shaft 38 and the rolling element bearing 342 is positioned radially between the shaft 38 and the journal bearing 344 and the journal bearing 344 is positioned radially between the rolling element bearing 342 and the static structure 24. The rolling element bearing 342 is rotatably mounted in the static structure 24 by the journal bearing 344 and the shaft 38 is rotatably mounted in the rolling element bearing 342. In this example the rolling element bearing 342 is a roller bearing, but it may be a taper roller bearing. The bearing arrangement 441 comprises a journal bearing 444 and a rolling element bearing 442. The rolling element bearing 442 and the journal bearing 444 are positioned radially between the shaft 38 and the static structure 24. In this arrangement the static structure 24 is arranged around the shaft 38 and the rolling element bearing 442 is positioned radially between the shaft 38 and the journal bearing 444 and the journal bearing 444 is positioned radially between the rolling element bearing 442 and the static structure 24. The rolling element bearing 442 is rotatably mounted in the static structure 24 by the journal bearing 444 and the shaft 38 is rotatably mounted in the rolling element bearing 442. In this example the rolling element bearing 442 is a ball bearing. A lubrication system is arranged to supply lubricant to the bearing arrangements 341 and 441.

A plurality of rolling elements 346 are arranged circumferentially around and are arranged to roll on an inner race 345 mounted on the shaft 38. The rolling elements 346 are mounted in a cage (not shown) which spaces the rolling elements 346 circumferentially. The rolling elements 346 and the cage are positioned radially between the shaft 38 and the journal bearing 344 and the journal bearing 344 forms an outer race of the rolling element bearing 342. The journal bearing 344 comprises a radially outer surface 350 and a radially inner surface 352 of the static structure 24 which is arranged to slide on the radially outer surface 350 of the journal bearing 344. A plurality of passages 354 extend radially through the shaft 38, and inner race 345, from the interior of the shaft 38 to the rolling element bearing 342 to supply lubricant to the rolling element bearing 342. Also a plurality of passages 356 extend radially through the journal bearing 344 from the rolling element bearing 342 to the surfaces 350 and 352 of the journal bearing 344 to supply lubricant from the rolling element bearing 342 to the journal bearing 344. Seals 358 are arranged at the axial ends of the rolling element bearing 342 to prevent the escape of lubricant. Alternatively, the seals 58 may be arranged to allow a controlled leakage flow of lubricant to avoid coking of the lubricant. The journal bearing 344 comprises a tubular member 348 which has a cylindrical outer surface 350 arranged to cooperate with a cylindrical inner surface 352 of the static structure 24.

A plurality of rolling elements 446 are arranged circumferentially around and are arranged to roll on an inner race 445 mounted on the shaft 38. The rolling elements 446 are mounted in a cage (not shown) which spaces the rolling elements 446 circumferentially. The rolling elements 446 and the cage are positioned radially between the shaft 38 and the journal bearing 444 and the journal bearing 444 forms an outer race of the rolling element bearing 442. The journal bearing 444 comprises a radially outer surface 450 and a radially inner surface 452 of the static structure 24 which is arranged to slide on the radially outer surface 450 of the journal bearing 444. A plurality of passages 454 extend radially through the shaft 38 from the interior of the shaft 38 to the rolling element bearing 442 to supply lubricant to the rolling element bearing 442. Also a plurality of passages 456 extend radially through the journal bearing 444 from the rolling element bearing 442 to the surfaces 450 and 452 of the journal bearing 444 to supply lubricant from the rolling element bearing 442 to the journal bearing 444. Seals 458 are arranged at the axial ends of the rolling element bearing 442 to prevent the escape of lubricant. Alternatively, the seals 58 may be arranged to allow a controlled leakage flow of lubricant to avoid coking of the lubricant. The journal bearing 444 comprises a tubular member 448 which has a cylindrical outer surface 450 arranged to cooperate with a cylindrical inner surface 452 of the static structure 24.

Alternatively, the rolling element bearings 342 and 442 may comprise a separate outer race which is located on the journal bearing 344 and 444. Alternatively, the rolling element bearings 542 and 642 may comprise a separate inner race which is located on the journal bearing 544 and 644. In this case the passages 354 or 454 may also extend through the inner race and the passages 356 or 456 must extend through the outer race.

In operation lubricant is supplied to the bearing arrangements 341 and 441. The lubricant flows through the passages 354 to the rolling element bearings 342 and 442 of the bearing arrangements 341 and 441 and then through the passages 356 and 456 from the rolling element bearings 342 and 442 to the journal bearing 344 and 444 of the respective bearing arrangements 341 and 441. The lubricant flows axially along the journal bearings 344 and 444 of the respective bearing arrangement 341 and 441 and is discharged from the axial ends of the journal bearings 344 and 444.

In normal operation the lubricant fills each of the rolling element bearings 342 and 442 and this results in a high level of drag within each of the rolling element bearings 342 and 442. At the same time the journal bearings 344 and 444 are also supplied with lubricant and therefore operate as normal. The high level of drag within the rolling element bearings 342 and 442 means that the journal bearings 344 and 444 present a lower internal friction than the rolling element bearings 342 and 442 and therefore rotation of the shaft 38 is allowed by the journal bearings 344 and 444 and not by the rolling element bearings 342 and 442. Hence, the rolling element bearings 342 and 442 will not experience very much rotation and therefore, while the contact stresses are high, the number of rotations will be relatively small resulting in high life expectancy. The rolling element bearings 342 and 442 are not actively restrained while the journal bearings 344 and 444 are functioning and therefore the rolling element bearings 342 and 442 will slowly rotate and hence reduce the possibility of fretting damage or false Brinelling damage.

In abnormal circumstances, when there is an interruption of the supply of lubricant, the lubricant flows from the rolling element bearings 342 and 442 of the respective bearing arrangements to the journal bearings 344 and 44 and then lubricant flows out of the journal bearings 344 and 444. The draining of lubricant from the rolling element bearings 342 and 442 reduces the internal friction of the rolling element bearings 342 and 442 and then the journal bearings 344 and 444 become starved of lubricant and the internal friction levels in the journal bearings increase as the surfaces 350 and 352 and 450 and 452 respectively come directly into contact. Eventually, the level of friction in the journal bearings 344 and 444 rises above the level of friction in the rolling element bearings 342 and 442 and therefore rotation of the shaft 38 is allowed by the rolling element bearings 342 and 442 and not by the journal bearings 344 and 444. Hence, the journal bearings 344 and 444 will not experience significant relative rotation between the surfaces 350 and 352 and 450 and 452 respectively and hence heat generation.

The bearings 43 and 243 to rotatably mount the extension shafts 36C and 236C respectively within the static structure 24 of the engine 10 and any other bearing used to rotatably mount the shaft 26 or the shaft 23 within the static structure 24 of the engine 10 may additionally comprise a journal bearing and a rolling element bearing as described above. The bearing arrangement may also be used to rotatably mount one rotating shaft within another rotating shaft.

Although the present disclosure has been described with reference to a geared gas turbine engine it is equally applicable to a bearing arrangement for a turbofan gas turbine, a turbojet gas turbine engine, a turbo-shaft gas turbine engine, a turbo-propeller gas turbine engine in which a gearbox is not arranged to drive a propulsor, e.g. for a bearing arrangement to rotatably mount a shaft within a static structure or within another shaft.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising a bearing arrangement for first and second relatively rotatable members, the bearing arrangement comprising a journal bearing and a rolling element bearing, the second member being arranged coaxially around the first member, the second member having a cylindrical inner surface, the rolling element bearing and the journal bearing being arranged radially between the first member and the second member, the rolling element bearing being positioned radially between the first member and the journal bearing and the journal bearing being positioned radially between the rolling element bearing and the second member, the journal bearing comprising a tubular member, the tubular member having a cylindrical outer surface arranged to cooperate with the cylindrical inner surface of the second member, the tubular member and the second member being relatively rotatable, the bearing arrangement comprising a lubricant supply to supply lubricant to the rolling element bearing and the journal bearing having at least one passage extending radially there-through to supply lubricant from the rolling element bearing to the journal bearing.

2. A gas turbine engine as claimed in claim 1 wherein the journal bearing forms an outer race of the rolling element bearing.

3. A gas turbine engine as claimed in claim 1 wherein the journal bearing carries an outer race of the rolling element bearing.

4. A gas turbine engine as claimed in claim 1 wherein the first member being a shaft and the second member being a static structure.

5. A gas turbine engine as claimed in claim 1 comprising a gearbox, the gearbox comprising a sun gear, an annulus gear, a plurality of planet gears and a planet gear carrier, the sun gear meshing with the planet gears and the planet gears meshing with the annulus gear, each planet gear being rotatably mounted in the planet gear carrier, the planet carrier comprising a plurality of axles arranged parallel to the axis of the gearbox, the axially spaced ends of each axle being secured to the planet carrier, each planet gear being rotatably mounted on a corresponding one of the axles by a bearing arrangement, each bearing arrangement comprising a journal bearing and a rolling element bearing, each planet gear being rotatably mounted on a journal bearing and each journal bearing being rotatably mounted on an axle by at least one rolling element bearing.

6. A gas turbine engine as claimed in claim 5 wherein the rolling element bearings are roller bearings.

7. A gas turbine engine as claimed in claim 5 wherein the rolling element bearings are needle roller bearings.

8. A gas turbine engine as claimed in claim 6 wherein each journal bearing is rotatably mounted on an axle by two rolling element bearings.

9. A gas turbine engine as claimed in claim 5 wherein the planet gear carrier comprises a first ring, a second ring spaced axially from the first ring and a plurality of circumferentially spaced axles extending axially between the first ring and the second ring, each planet gear being rotatably mounted on a respective one of the axles.

10. A gas turbine engine as claimed in claim 5 wherein each axle has at least one passage extending radially there-through to supply lubricant to the at least one rolling element bearing.

11. A gas turbine engine as claimed in claim 10 wherein the axial ends of the at least one rolling element bearing on each axle are sealed and each journal bearing has at least one passage extending radially there-through to supply lubricant from the at least one rolling element bearing to the journal bearing.

12. A gas turbine engine as claimed in claim 5 comprising a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

13. A gas turbine engine as claimed in claim 5 comprising a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

14. A gas turbine engine as claimed in claim 12 wherein the sun gear is driven by the low-pressure turbine, the annulus gear is secured to static structure and the planet gear carrier is arranged to drive the propulsor.

15. A gas turbine engine as claimed in claim 12 wherein the sun gear is driven by the low-pressure turbine, the planet gear carrier is secured to static structure and the annulus gear is arranged to drive the propulsor.

16. A gas turbine engine as claimed in claim 12 wherein the propulsor is selected from the group consisting essentially of a fan and a propeller.

17. A gas turbine engine as claimed in claim 1 wherein the rolling element bearing is selected from the group consisting essentially of a roller bearing, a taper roller bearing and a ball bearing.

18. A gas turbine engine as claimed in claim 1 wherein the rolling element bearing having axial ends, the axial ends of the rolling element bearing having seals.

19. A gearbox comprising a sun gear, an annulus gear, a plurality of planet gears and a planet gear carrier, the sun gear meshing with the planet gears and the planet gears meshing with the annulus gear, each planet gear being rotatably mounted in the planet gear carrier, the planet carrier comprising a plurality of axles arranged parallel to the axis of the gearbox, the axially spaced ends of each axle being secured to the planet carrier, each planet gear being rotatably mounted on a corresponding one of the axles by a bearing arrangement, each bearing arrangement comprising a journal bearing and a rolling element bearing, each planet gear being rotatably mounted on a journal bearing and each journal bearing being rotatably mounted on an axle by at least one rolling element bearing, each planet gear having a cylindrical inner surface, each journal bearing comprising a tubular member, the tubular member of each journal bearing having a cylindrical outer surface arranged to cooperate with the cylindrical inner surface of the corresponding planet gear, each tubular member and the corresponding planet gear being relatively rotatable, the bearing arrangement comprising a lubricant supply to supply lubricant to each rolling element bearing and each journal bearing having at least one passage extending radially there-through to supply lubricant from the corresponding rolling element bearing to the journal bearing.

20. A bearing arrangement for first and second relatively rotatable members, the bearing arrangement comprising a journal bearing and a rolling element bearing, the second member being arranged coaxially around the first member, the second member having a cylindrical inner surface, the rolling element bearing and the journal bearing being arranged radially between the first member and the second member, the rolling element bearing being positioned radially between the first member and the journal bearing and the journal bearing being positioned radially between the rolling element bearing and the second member, the journal bearing comprising a tubular member, the tubular member having a cylindrical outer surface arranged to cooperate with the cylindrical inner surface of the second member, the tubular member and the second member being relatively rotatable, the bearing arrangement comprising a lubricant supply to supply lubricant to the rolling element bearing and the journal bearing having at least one passage extending radially there-through to supply lubricant from the rolling element bearing to the journal bearing.

* * * * *